United States Patent Office 3,738,939
Patented June 12, 1973

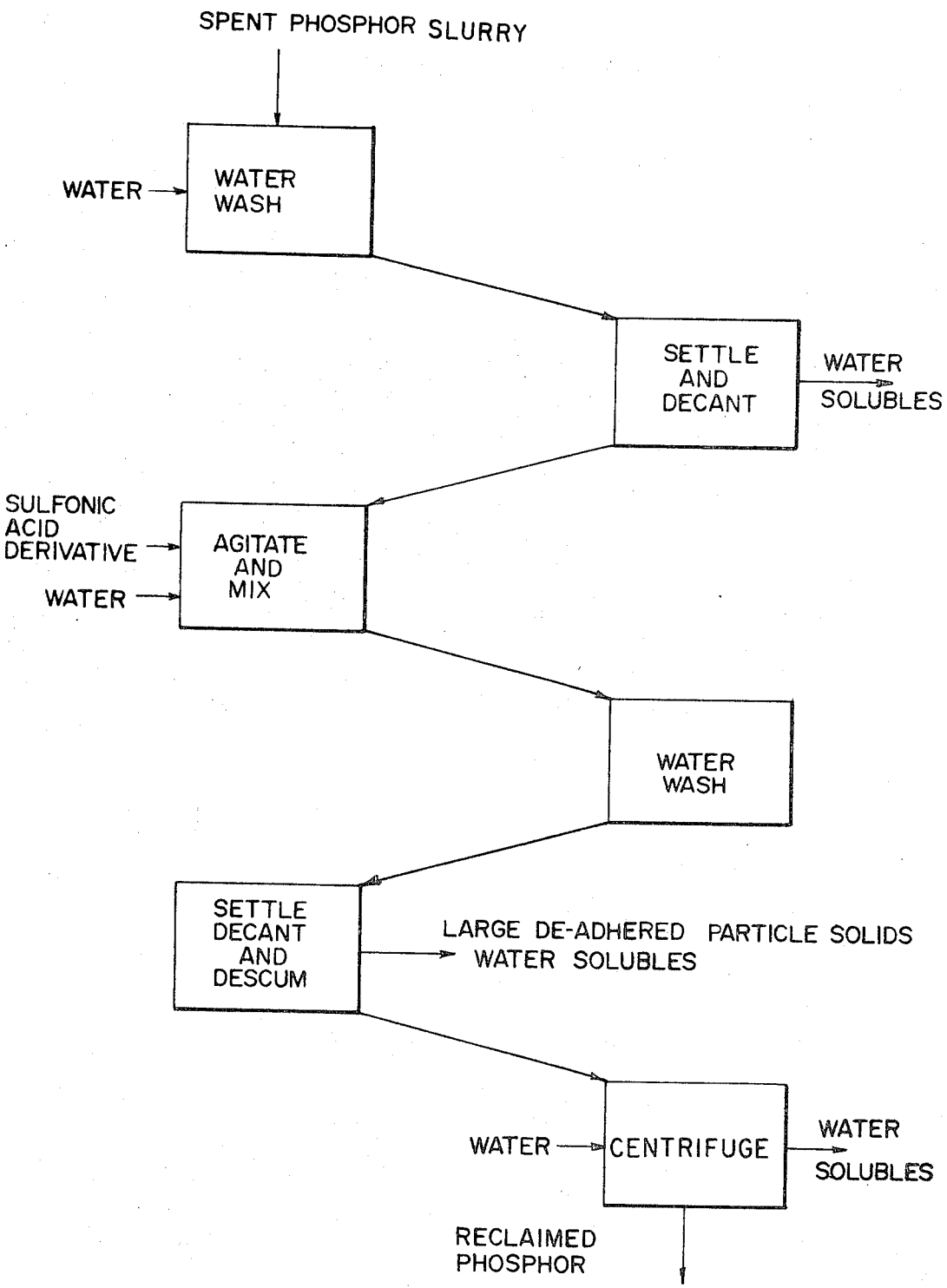

3,738,939
PROCESS FOR RECLAIMING PHOSPHORS FROM USED (SPENT) SLURRIES AND RELATED AREAS
David Single, Chicago, Ill., assignor to Motorola Inc., Franklin Park, Ill.
Continuation-in-part of abandoned application Ser. No. 786,927, Dec. 26, 1968. This application Jan. 26, 1971, Ser. No. 109,919
Int. Cl. B01j 9/14; C09k 1/12
U.S. Cl. 252—301.6 S    3 Claims

ABSTRACT OF THE DISCLOSURE

A spent (phosphor) slurry used in the manufacture of a color cathode ray tube is processed for reuse by a sequence of steps including the washing with water of a sludge containing the phosphor and water soluble and insoluble conglomerates, and mixing therewith a sulphonic acid derivative. The sulphonic acid derivative acts as a de-adherent to break up the conglomeration into products which are removed by washing, leaving the reclaimed phosphor.

CROSS REFERENCE TO RELATED APPLICATIONS

This is a continuation-in-part of my application Ser. No. 786,927, filed Dec. 26, 1968, now abandoned and assigned to the same assignee.

BACKGROUND OF THE INVENTION

This invention relates to the slurry process for the manufacture of phosphor screens for color cathode ray tubes, and more particularly to a method for reclaiming the phosphor from a used slurry.

In the slurry process, a phosphor screen is typically prepared in three separate stages. For example, a faceplate panel may first be provided with a systematic array of blue phosphor dots or areas; second, the panel is provided with a similar array of green phosphor areas; and third, the panel is provided with an array of red phosphor areas. The resulting combination is an array of phosphor triads, each triad consisting of a blue, a green and a red phosphor area. A particularly useful combination is zinc sulfide as the blue phosphor, zinc cadmium sulfide as the green phosphor, and yttrium orthovanadate as the red phosphor.

In each stage of the operation, an aqueous slurry of a powdered phosphor is fed upon the faceplate panel by a centrifugal action obtained by spinning the panel. The excess slurry is dumped off or returned to the dispensing vessel by various mechanical means. The slurries are usually composed of water, phosphor, polyvinyl alcohol (PVA) and ammonium di-chromate. The water acts as a carrier and solvent for the PVA and the ammonium di-chromate. The PVA is a film forming water-soluble polymer that when mixed with the salts of ammonium di-chromate or potassium di-chromate will react in a bridging or cross-linking manner, resulting in a photosensitive film. The film permits the making of any pattern on the faceplate panel by exposing it to ultra violet light thus rapidly insolubilizing the exposed area and also permits the binding of the color producing phosphor to the glass of the panel to form a screen for a color cathode ray tube.

The polymerization or cross-linking reaction occurring in the PVA-ammonium di-chromate-type photosensitive slurry is continuously occurring once the ammonium di-chromate is added. The slurry can be recirculated from the dispenser to the face plate and back to the dispenser container. However, with time, temperature and light, the slurry will soon spoil forming water insoluble pieces, aggregates, loss of photosensitivity, and other undesirable properties which prohibit its use.

SUMMARY

It is an object of this invention to provide a process for reclaiming phosphors from spent slurries thereof used in the manufacture of colored cathode ray tubes.

It is another object of this invention to recover, using a relatively inexpensive process, certain phosphors, including zinc cadmium sulfide and zinc sulfide, for example, from spent slurries resulting in the manufacture of phosphor screens for color cathode ray tubes. The process yields purified green and blue phosphors which are substantially free of contamination and which preserve the original quality of the phosphor crystal.

The invention is embodied in a method for reclaiming or purifying phosphors including primarily zinc sulfide and zinc cadmium sulfide. The method includes the step of washing with water the conglomerate of phosphor, PVA and ammonium di-chromate to wash the phosphor free of all unreacted PVA and ammonium di-chromate, both of which are soluble in water. The diluted slurry is then allowed to settle and the water is decanted from the top thereof. A sulphonic acid derivative is then added to the contaminated phosphor along with water to dilute the same and the solution is mixed for several hours and allowed to settle. The sulphonic acid derivative acts as a de-adherent to break up the conglomeration and to de-coat the phosphor. The hardened PVA and ammonium di-chromate are then de-adhered and floated off into the water phase, which is decanted and de-scummed from the tank leaving a relatively pure phosphor. The phosphor is washed again and then pumped to a centrifuge where it is dewatered and recovered in a reusable form.

DESCRIPTION OF THE DRAWING

The sequence of operation in this process is diagrammatically illustrated in the attached drawing.

DETAILED DESCRIPTION

In one particular embodiment, the phosphor to be reclaimed is the green phosphor, zinc cadmium sulfide, which is contained in a slurry formed from water, polyvinyl alcohol (PVA) and ammonium di-chromate. The PVA is a film forming water-soluble polymer that, when mixed with ammonium di-chromate sensitizer, reacts in a cross-linking manner to form a water-insoluble film. After a given period of time because water insoluble aggregates and other disorders have continuously formed the slurry spoils and forms an unusable sludge. When recovering the phosphor from the sludge in accordance with this invention, 125–200 pounds of the sludge containing the conglomeration is placed into a 115 gallon s.s. tank; 90 gallons of de-ionized (D.I.) water are added to the tank and the solution is agitated for one to four hours. The agitator in the tank is turned off and the solution is allowed to settle for a period approximating 5 hours. The supernatant liquid is then decanted off the settled phosphor. This wash procedure is then repeated up to four times, or as needed.

Subsequently, the washing tank is filled with one to fifty gallons D.I. water and agitated. Approximately one pound of sulphonic acid derivative is added to the solution and then mixed for approximately five hours. The sulphonic acid derivative, for example, can be formed of a natural sodium salt of a condensed arylsulfonic acid. One such sulphonic acid derivative is obtained under the trade name TAMOL SN from Rohm and Haas Company, Philadelphia, Pa. and which is identified as the neutral sodium salt of a formaldehyde condensed naphthalene sulfonic acid. Another compound containing the desired sulphonic acid derivative is BENAX 2A1 and obtained from Dow Chemical Company as surfactant type-disodium 4 dodecylated oxdibenzene sulfonate. Still another compound containing the desired sulphonic acid derivative is NEKAL BX78 obtained from General Aniline and Film Corp. as sodium alkyl naphthalene sulfonate. The sulphonic acid derivative obtained from these compounds acts as a de-adherent to break the adhesive bond between the PVA and the phosphor thus releasing the phosphor from the PVA film. The released PVA and ammonia di-chromate is floated into the water phase and is readily decanted off. However, some of the larger particles which may not be soluble will float to the surface and are then taken off by de-scumming. De-scumming can be accomplished by using vacuum apparatus or the like.

Finally, the tank is filled to the 50 gallon level with water and the solution is pumped through a 325 mesh filter to a centrifuge where it is de-watered. The pure phosphor crystals remain and can be used for production even in a damp form.

What has been described, therefore, is a unique process for reclaiming phosphor from a water insoluble aggregate which preserves the original quality of the phosphor crystal.

I claim:

1. A method for reclaiming a phosphor which is used in a slurry for coating the faceplate panel of a color television tube selected from the group consisting of zinc cadmium sulfide and zinc sulfide from a water insoluble aggregate of polyvinyl alcohol and the group of dichromate salts including ammonium or potassium, including the steps of washing with water a sludge containing the phosphor in the water insoluble aggregate, removing the water therefrom, mixing one of the family of sulfonic acid derivatives consisting of a neutral sodium salt of a formaldehyde condensed naphthalene sulfonic acid, sodium alkyl naphthalene sulfonate and disodium 4 dodecylated oxdibenzene therewith, washing with water, and removing the water therefrom.

2. The method of claim 1 wherein the step of removing the water from the sludge wash comprises settling and decanting.

3. The method of claim 1 wherein the step of removing the water subsequent to mixing with the sulfonic acid derivative comprises settling, decanting and de-scumming, and the method further includes the steps of adding water following the settling and decanting, and pumping the solution through a filter to a centrifuge, and dewatering the same in the centrifuge.

References Cited

UNITED STATES PATENTS

| | | | |
|---|---|---|---|
| 3,523,904 | 8/1970 | Single | 252—301.6 S |
| 3,474,040 | 10/1969 | Hedler et al. | 252—301.4 R |
| 2,710,286 | 6/1955 | Zachariason | 252—301.6 S |

EDWARD J. MEROS, Primary Examiner

J. COOPER, Assistant Examiner

U.S. Cl. X.R.

23—312